May 2, 1967     J. H. BRYANT     3,317,747
DETECTION APPARATUS FOR INDICATING WHEN
A VOLTAGE IS ABOVE OR BELOW NORMAL
Filed Jan. 24, 1964
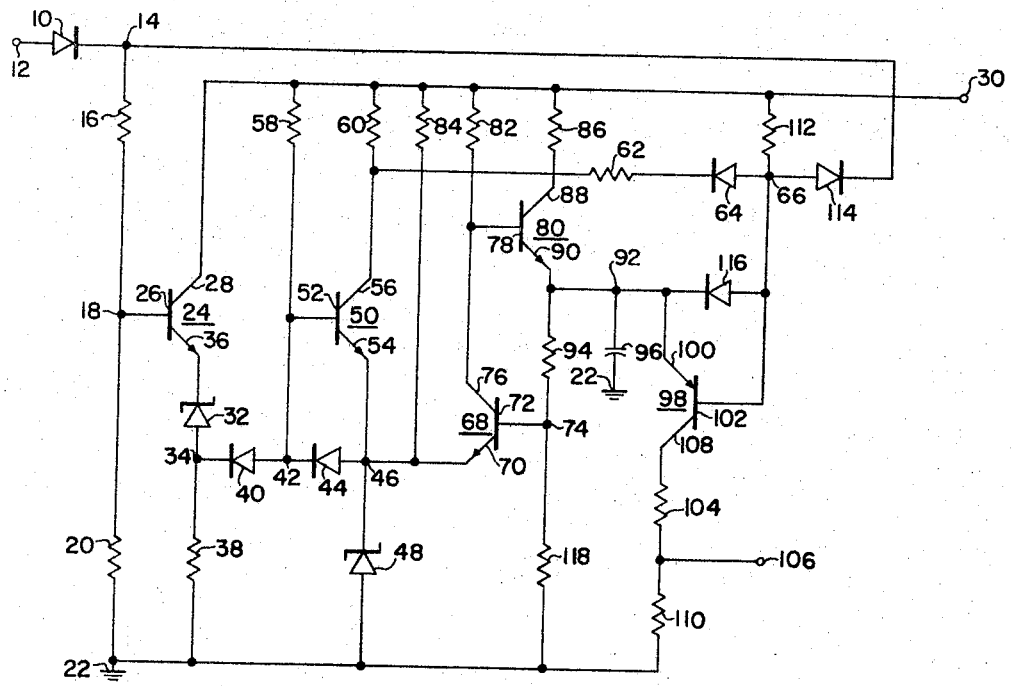
INVENTOR.
JOHN H. BRYANT
ATTORNEY United States Patent Office 3,317,747
Patented May 2, 1967

3,317,747
DETECTION APPARATUS FOR INDICATING WHEN A VOLTAGE IS ABOVE OR BELOW NORMAL
John H. Bryant, Pinellas Park, Fla., assignor to Honeywell Inc., a corporation of Delaware
Filed Jan. 24, 1964, Ser. No. 339,979
3 Claims. (Cl. 307—88.5)

ABSTRACT OF THE DISCLOSURE

A circuit for monitoring deviations from a pre-determined, settable voltage which utilizes two detection circuits. The first circuit detects a lower than normal voltage directly. The second circuit detects a higher than normal voltage and applies its output as a low voltage to actuate the first detection circuit.

This invention is directed generally toward electronic circuits and more particularly to a circuit which will provide an output whenever an input voltage being monitored varies more than a predetermined amount from a given nominal voltage.

While prior art voltage monitoring circuits have tended to be somewhat bulky and complex, the present invention provides a circuit which utilizes a minimum number of components and still detects excessive variations in the voltage being monitored from a nominal value. Briefly the circuit utilizes a regulator circuit for providing a reference output voltage. A first switching circuit or detection circuit is connected both to this regulator and to the source of input voltage and will provide an output whenever the input voltage varies a predetermined amount in a given direction with respect to the voltage supplied by the voltage regulator. In the drawing shown, this switch will operate when the input voltage becomes lower than the output voltage from the regulator. When the voltage exceeds a predetermined upper limit, a second switching means, detection circuit or high voltage detecting means, which is connected both to the input and to the voltage regulator, supplies an output which is connected to the first switching circuit to lower the voltage at one input of the first switching circuit and again provide an output voltage or signal. As may be noted, the first switching circuit receives its input signals from a plurality of different sources and therefore may be switched directly by the input signal or may be switched to provide an output from the high voltage detecting means.

It is an object of this invention to provide means which will supply an output whenever an input signal being monitored exceeds predetermined variations from a nominal or normal value.

Further objects and advantages of this invention may be ascertained from a reading of the specification and accompanying claims in conjunction with the single figure which is a circuit diagram of one embodiment of the invention.

While specific terms such as transistors will be used throughout the specification it is to be realized that tubes or other voltage or current responsive elements could also be used as well as polarized relays etc. for some of the components. I therefore do not wish to be limited by the terms used in the specification but only by the scope of the claims taken in their broadest sense.

In the figure a diode means, rectifying means, or nonlinear resistance means 10 is connected between an input terminal 12 and a junction point 14. The diode 10 is conected to provide a direction of easy current flow from input terminal 12 to junction point 14. As will be realized by those skilled in the art, a diode has a direction of easy current flow from the anode toward the cathode much the same as in a regular tube type diode. A resistor or resistive means 16 is connected between the junction point 14 and a junction point 18. A second resistor 20 is connected between the junction point 18 and ground or reference potential 22. The resistors 16 and 20 are part of the voltage dividing network or voltage dropping means which determines the potential at the junction point 18. A NPN transistor means, switching means, voltage detection means or amplifying means generally designated as 24 has a base 26 connected to junction point 18 and has a collector 28 connected to a power terminal or power supply means 30. A zener diode means, voltage dropping means, or reference means 32 is connected between a junction point 34 and an emitter 36 of the transistor 24. The zener diode 32 is connected in such a manner that the direction of easy current flow is from junction point 34 toward the emitter 36. It will be further realized by those skilled in the art that the direction of easy current flow through a zener diode is opposite from the direction in which the zener effect will take place. A resistor 38 is connected between the junction point 34 and ground 22. A diode means or voltage dropping means 40 is connected between the junction point 34 and a junction point 42. Another diode 44 is connected between the junction point 42 and a junction point 46. The two diodes 40 and 44 are connected such that the direction of easy current flow is from junction point 46 through junction point 42 and to junction point 34. A zener diode means, voltage dropping means, or reference means 48 is connected between the junction point 46 and ground 22 in a manner such that easy current flow is from ground 22 toward junction point 46. A NPN transistor means, switching means, amplifying means, or voltage detection means 50 has a base 52 connected to junction point 42. The transistor 50 also has an emitter 54 which is connected to junction point 46 and a collector 56. A resistive means or resistor 58 is connected between power supply means 30 and base 52. Another resistive means or resistor 60 is connected between power supply means 30 and the collector 56 of transistor 50. A resistor or resistive means 62 is connected in series with a diode means or nonlinear resistance means 64 between the collector 56 and a junction point 66. The diode 64 is connected in a manner to permit easy current flow from junction point 66 toward collector 56. A switching means, amplifying means, or NPN transistor means 68 has an emitter 70 connected to junction point 46 and has a base 72 connected to a junction point 74. A collector 76 of transistor 68 is connected to a base 78 of a NPN transistor means, switching means, voltage reference means, or amplifying means 80. A resistor or resistive means 82 is connected between power supply means 30 and base 78 of transistor 80. A resistor or resistive means 84 is connected between power supply means 30 and junction point 46. A resistor or resistive means 86 is connected between positive power supply means 30 and a collector 88 of transistor 80. Transistor 80 also has an emitter 90 which is connected to a junction point 92. A resistor or resistive means 94 is connected between junction point 92 and junction point 74. A capacitive means, filter means or charging means 96 is connected between junction point 92 and ground 22. A switching means, differential voltage detecting means, valve means, or PNP transistor means 98 has an emitter 100 connected to junction point 92 and a base 102 connected to junction point 66. A resistor or resistive means 104 is connected between an output terminal 106 and a collector 108 of the transistor 98. A resistor or resistive means 110 is connected between output terminal 106 and ground 22. A resistor or resistive means 112 is connected between the power terminal 30 and junction point 66. A diode means, non-linear resistance means, or voltage blocking means 114 is connected between the junction point 66 and junction point 14. The diode means 114 is connected to provide a easy current flow path from junction point 66 to junction point 14. A diode means 116 is conected between junction point 66 and the junction point 92 with the direction of easy current flow toward junction point 92. A resistor or resistive means 118 is connected between the junction point 74 and ground 22.

It may be assumed that in normal operation the voltage to be monitored which is applied at input 12 is of the potential which is lower than the supply voltage applied at power supply means 30. It may be further assumed that during normal operation the voltage applied at terminal 12 will not cause an output from terminal 106. In other words, transistor 98 will normally be in an OFF condition and output terminal 106 will be near ground potential. For convenience in discussing the circuit it may be assumed that the potential at terminal 30 is 24 volts and the nominal voltage at input 12 is 22 volts. The two transistors 68 and 80 along with the zener diode 48 operate to provide a fairly common voltage regulator circuit. There are two regulated outputs one of which is at junction point 92 and the other of which is at junction point 46. The reference voltage at 46 is of course determined by the zener diode 48 while the voltage at junction point 92 is determined by the two transistors 68 and 80 as compared to the stability of the zener diode 48 and the power supply voltage at terminal 30. A slight explanation will be given in that when power is supplied to terminal 30, transistor 80 will turn to a partial ON condition and allow current flow through resistors 86, 94 and 118. This current flow will bias transistor 68 to an ON condition and allow current flow through resistor 82 to ground 22. Current will also flow through resistor 84 to ground 22. There are two current flow paths for the current one of which is through zener diode 48 and the other of which is through the two diodes 40 and 44 and then to ground 22 through resistor 38. The voltage at junction point 74 is compared with the voltage at junction 46 and the transistor 68 is regulated accordingly so as to keep the transistor 80 in a condition such that junction point 92 is substantially constant. For convenience it may be assumed that this voltage is approximately 18 volts.

With the conditions described in the above paragraph, it may be noted that there will be current flow from input 12 through diode 10 and the resistors 16 and 20 to ground 22. The voltage drop through diode 10 will place junction point 14 at approximately one half volt below the potential at input 12 or therefore approximately 21.5 volts. The junction point 14 will continually follow approximately one half volt below the voltage of input 12. Current flow also goes to ground 22 from power terminal means 30 through resistor 112, diode 114 and resistors 16 and 20. However, since the input at 12 determines the potential at 14, this also determines the potential at junction point 66. Since there is also a half volt voltage drop through diode 114, junction point 66 will be at approximately 22 volts or at approximately the same voltage as the input terminal 12. If the voltages on the base and the emitter of transistor 98 are now observed it may be noted that the base 102 is at 22 volts which is positive with respect to the emitter 100 voltage of 18 volts. Therefore transistor 98 will stay in an OFF condition and there will be no output at terminal 106. Another possible current flow path to bring down the potential at junction point 66 is through diode 64 and resistor 62 to ground through transistor 50. However, if the zener diode 32 is of a large enough value so that with 22 volts supplied to 12 the base 26 of transistor 24 is negative with respect to emitter 36, there will be no current flow through zener diode 32 and therefore the transistor 50 will be biased from emitter to base by the voltage drop across diode 44. With transistor 50 biased in this condition, it will remain OFF and there will be no current flow therethrough. Thus junction point 66 will have to follow the potential of junction point 14 as long as the input potential is lower than that necessary to turn transistor 24 ON and lower than the voltage at terminal 30.

It may be assumed that the voltage which is being monitored and which is applied to terminal 12 is now lowered to a value below the potential of junction point 92 and may be assumed to be a value of somewhere around 12 volts. The voltage drop through diode 10 will then place junction point 14 at approximately 11.5 volts and thus the junction point 66 will be approximately 12 volts. Since the base 102 of transistor 98 is now negative with respect to or is of a lower potential than the emitter 100, transistor 98 will turn to an ON condition and raise the potential at output terminal 106. It may be noted that the lowering of the potential a terminal 12 will not affect transistor 24 since the reason it had not turned ON previously was that the base 26 was of too low a potential with respect to emitter 34. If the input voltage applied to terminal 12 is raised in value to some potential such as 30 volts, it can be seen that junction point 66 will no longer follow since the diode 114 will be back biased. The diode 114 will be back biased since the potential of the power supply is 24 volts and is less than the input voltage being monitored. However, as described so far, transistor 98 still will not react since there is no current flow path whereby base 102 of transistor 98 is placed at a potential lower than emitter 100. It may be assumed however that the 30 volts applied to terminal 12 will raise the voltage at junction point 18 in the voltage divider network such that base 26 is positive with respect to emitter 36. This result can be obtained by choosing a diode with the proper zener voltage for zener diode 32. When base 26 becomes positive with respect to emitter 36, transistor 24 will turn to an ON condition and raise the potential of junction point 34. When this junction point is raised, there will no longer be current flow through diodes 44 and 40 and transistor 50 will accordingly be biased by resistor 58 such that transistor 50 will turn to an ON condition. When transistor 50 turns ON, the potential at collector 56 will be lowered toward the potential at junction point 46 and provide a current flow path so that transistor 98 can turn ON. In other words, the junction point 66 will lower in potential as the collector 56 lowers in potential and will place the base 102 at a voltage which is less than the 18 volts appearing at junction point 92. When this happens the output terminal 106 will raise in potential to provide an output indicative of the fact that the voltage applied to input terminal 12 has exceeded a predetermined value.

As will be realized by those skilled in the art, the opposite polarity voltage can be detected by merely reversing the polarity types of the transistors involved and reversing the polarity of the supply voltage. As previously mentioned many other components such as tubes, control rectifiers, polarized relays, etc. may be used in place of some of the individual components of the circuit and other specific circuits may be also used to accomplish the objectives of this invention.

In summary it is to be realized that the invention lies in the use of two detection circuits which receive an input signal from a source of the signal to be monitored and a first of which will provide an output upon excessive variation of the input signal in a first direction and the second of which will actuate the first switch so as to provide an output upon an excessive variation of the input signal by more than a predetermined amount in the other of two directions. Although the circuit was described as monitoring voltage, it is to be realized that with the proper detectors, other parameters such as current, phase, and polarity can be monitored. It should be further realized that the portion of the circuit utilizing transistors 24 and 50 constitute an inverter circuit and may be characterized as such in the claims. Therefore I wish to be limited not by the specification or the drawing but only by the scope of the appended claims.

What is claimed is:

1. Voltage monitoring aparatus comprising, in combination:
   first means for supplying an input voltage to be monitored;
   ground means;
   power supplying means;
   reference voltage supplying means connected to said power supplying means, said reference voltage supplying means including first and second output means for supplying first and second reference voltages respectively with respect to said ground means;
   voltage divider network means connected between said first means and said ground means;
   switching means including first and second input means and output means, said switching means providing an output whenever said first input means is at a lower voltage potential than said second input means;
   second means connecting said first output means of said reference voltage supplying means to said second input means of said switching means;
   third means connecting said first input means of said switching means to said power supplying means and to said first means, said switching means thereby providing an output when the input voltage to be monitored lowers the potential at said first input means of said switching means excessively;
   high voltage detection means connected to said voltage divider network means and to said second output means of said reference voltage supplying means, said high voltage detection means including output means, said high voltage detection means providing a low voltage output of a potential less than that appearing at said first output means of said reference voltage supplying means when the input voltage exceeds a predetermined potential; and
   fourth means connecting said output means of said high voltage detection means to said first input means of said switching means.

2. Voltage monitoring apparatus comprising, in combination:
   first means for supplying an input voltage to be monitored;
   power supplying means;
   reference voltage supplying means connected to said power supplying means, said reference voltage supplying means including first and second output means for supplying first and second reference voltages respectively;
   voltage dropping means connected to said first means;
   switching means including first and second input means and output means, said switching means providing an output whenever said first and second input means are in a predetermined voltage relationship;
   second means connecting said first output means of said reference voltage supplying means to said first input means of said switching means;
   third means connecting said second input means of said switching means to said power supplying means and to said first means, said switching means thereby providing an output when the input voltage to be monitored lowers excessively;
   high voltage detection means connected to said voltage dropping means and to said second output means of said reference voltage supplying means, said high voltage detection means including output means, said high voltage detection means including a low voltage output of a potential less than that appearing at said first output means of said reference voltage supplying means when the input voltage exceeds a predetermined potential; and
   fourth means connecting said output means of said high voltage detection means to said second input means of said switching means.

3. Voltage monitoring apparatus comprising, in combination:
   first means for supplying an input voltage to be monitored;
   reference voltage supplying means including first and second output means;
   voltage dropping means connected to said first means;
   switching means including input means and output means, said switching means providing an output whenever signals of predetermined relationships are applied to said input means;
   second means connecting said first output means of said reference voltage supplying means to said input means of said switching means;
   third means connecting said input means of said switching means to said first means, said switching means thereby providing an output when the input voltage to be monitored become less than a predetermined amount; and
   high voltage detection means connected to said voltage dropping means, to said switching means and to said second output means of said reference voltage supplying means, said high voltage detection means providing an output of a potential such that said switching means is actuated to provide an output when the input voltage exceeds a predetermined potential.

References Cited by the Examiner

UNITED STATES PATENTS

| | | | |
|---|---|---|---|
| 3,048,715 | 8/1962 | Horton | 307—88.5 |
| 3,225,213 | 12/1965 | Hinrichs et al. | 307—88.5 |

ARTHUR GAUSS, *Primary Examiner.*

R. H. EPSTEIN, *Assistant Examiner.*